United States Patent Office 3,089,822
Patented May 14, 1963

---

3,089,822
STERILE AQUEOUS SOLUTIONS OF VITAMIN D AND CALCIUM SALTS AND METHOD OF MAKING THE SAME
Jakob Schenk, Bern, Switzerland, assignor, by mesne assignments, to The Wander Company, Chicago, Ill., a corporation of Delaware
No Drawing. Filed Feb. 2, 1959, Ser. No. 790,374
Claims priority, application Switzerland Feb. 11, 1958
6 Claims. (Cl. 167—81)

This invention relates to novel improvements in aqueous solutions of vitamin D and calcium salts. More particularly, the invention relates to novel sterile solutions of the foregoing ingredients which are characterized by exceptional stability and are especially suited for parenteral administration.

In the therapeutic administration of vitamin D and calcium salts in combination, a long-standing problem has existed of providing non-toxic solutions which are suitable for intravenous or intramuscular injection. Although calcium salts are water soluble, the vitamins D are water insoluble and special techniques must be employed to obtain aqueous solutions of such vitamins. It is known that the oil or fat soluble vitamins such as vitamin D can be solubilized for use in aqueous solution by means of certain types of organic surface active agents or emulsifiers, but in general only limited amounts of the usual solubilizing agents can be tolerated without undesirable side effects. Furthermore, preparations containing vitamin D and calcium salts for parenteral administration must be sterilized before use and this requirement introduces further difficulties, as hereinafter described in more detail.

Accordingly, a primary object of the invention is to provide clear, stable, non-toxic aqueous solutions containing a vitamin D and a calcium salt which are suitable for parenteral administration.

A further object of the invention is to provide novel aqueous solutions of the foregoing character which are sterile.

Another object of the invention is to provide a novel method of making sterile aqueous solutions containing a vitamin D and a calcium salt.

The first source of difficulty encountered in the preparation of a combined solution of vitamin D and a calcium salt is the fact that these two materials have different solubility properties. The calcium salts are readily soluble in water but vitamin D is water insoluble. Organic solubilizing agents may be used to introduce vitamin D into an aqueous medium, but many of the known solubilizing agents for vitamin D have only limited utility. For example, in certain aqueous preparations heretofore known containing adequate dosage amounts of calcium salts, the concentration of vitamin D is low and large quantities of such preparations cannot be administered because of the toxicity or intolerable side effects of the solubilizing agent. On the other hand, there are other preparations previously known which contain either non-aqueous solvents or large amounts of organic solubilizing agent sufficient to provide an adequate concentration of vitamin D but such preparations can contain only therapeutically inadequate amounts of calcium. Furthermore, preparations of the latter character are also unsatisfactory because they cannot be injected intravenously without special precautions.

However, it is possible to overcome the aforementioned solubility problem by means of certain highly effective solubilizing agnts such as the mono-fatty acid esters of polyalkylene oxides, particularly polyethylene glycol monoricinoleate having from about 30 to about 50 oxyethylene groups per molecule. Solubilizing agents of this type are characterized not only by very low toxicity but also by their excellent solubilizing capacity for vitamins D with the result that they can be employed in surprisingly small amounts to provide aqueous solutions containing therapeutically adequate dosage amounts of vitamin D and calcium salt. For example, as little as 5 mg. of the above-mentioned polyethylene glycol monoricinoleate is sufficient to produce 10 ml. of aqueous solution containing 1 gm. of calcium gluconate glucoheptane and 0.56 mg. of vitamin D (22,000 I.U.).

However, even though the use of certain preferred solubilizing agents makes it possible to obtain aqueous solutions containing the desired concentrations of vitamin D and calcium salt, nevertheless, such solutions have an important disadvantage in that they cannot be sterilized by heat without destroying their stability. This difficulty is caused by the fact that solubilizing agents of the polyoxyalkylene type tend to precipitate from aqueous solutions when heated but will go back into solution when cooled down. Thus, if an aqueous solution containing vitamin D and a solubilizing agent of this type is heated, both the solubilizing agent and the vitamin D will precipitate together but when the solution is cooled down it has been found that the vitamin D ingredient fails to go back into solution properly. This is particularly true if the concentration of solubilizing agent is low. Such heat sterilized solutions show at first an opalescent clouding and gradually form a crystalline vitamin D precipitate wtih the result that they rapidly become unsuited for parenteral administration. The use of larger quantities of solubilizing agent assists in avoiding this difficulty but in such case the toxicity of the solution is greatly increased so that it becomes unsuited for intravenous or intramuscular injection. On the other hand, sterilization by heat is considered to be essential for preparations which are to be administered parenterally and this is particularly true when the solution contains calcium salts of the poly-carboxylic acids which have a sugar-like constitution and are, therefore, favorable nutritive media for the growth of microorganisms. Aseptic filtration is uneconomical and unreliable and furthermore the vitamin ingredients of the solution tend to be partially adsorbed on the filter. Moreover, there is a danger that in aqueous solutions containing surface active agents the germs or microorganisms may pass through the filter.

I have now discovered that the heat sterilization problem can be overcome by utilizing low molecular weight fatty acid esters of vitamin D instead of the free vitamin D alcohols. For practical reasons, vitamin D propionate and butyrate are the preferred esters. Thus, aqueous calcium salt solutions containing the propionates or butyrates of vitamins $D_2$ or $D_3$ wtih a suitable solubilizing agent of the polyoxyalkylene type may be sterilized by heat and after cooling the resultant solutions are clear and stable. However, preparations of similar composition, except for the use of free vitamin D alcohols instead of the aforementioned esters, always produce cloudy unstable solutions after heat sterilization with a strong tendency toward separation of crystalline vitamin D. Moreover, such undesirable effects persist even if the amount of solubilizing agent is doubled.

The use of the low molecular weight fatty acid esters of vitamin D not only permits heat sterilization of the aqueous vitamin D-calcium salt solution but makes this possible without the use of excessive amounts of the solubilizing agent. The latter while necessary must nevertheless be considered an unavoidable inert substance which has toxic effects in large amounts. Consequently, the ability to employ only moderate amounts of solubilizing agent while still providing a clear and stable solution is a great advantage, especially where a single large dose or repeated smaller doses must be administered parenterally as is frequently the case in calcium therapy. Of course, the preparations of the present invention may also be administered orally in the conventional manner.

The unexpected stability of the heat sterilized aqueous solutions of calcium salts and vitamin D esters as described above is probably explained by the fact that, unlike the free vitamin D alcohols, the vitamin D esters cannot associate with water.

The solubilizing agents which may be used in accordance with the invention comprise generally the polyoxyalkylene compounds, e.g. the mono-fatty acid esters of polyethylene glycol, the partial esters of fatty acids and polyhydric alcohols, or the anhydrides of such alcohols, etherified with polyalkylene oxides. In particular may be mentioned such compounds as sorbitan monolaurate-(ethylene oxide)$_{20}$, the analogous compounds containing palmitic or oleic acid, and propylene glycol monostearate-(ethylene oxide)$_{25}$. Because of its outstanding solubilizing effectiveness and low toxicity, the preferred solubilizing agent is polyethylene glycol monoricinoleate having from about 30 to about 50 oxyethylene groups per molecule.

The usual calcium salts used in calcium therapy may be employed, particularly calcium gluconate, calcium glucoheptonate, calcium gluconate glucoheptane, calcium levulinate, calcium saccharate, and calcium methionate (calcium salt of methylene disulfonic acid). Obviously, to the solutions prepared according to the present invention may be added other salts or vitamins, particularly water soluble vitamins such as ascorbic acid or vitamins of the B group.

The procedure used in preparing the sterile solutions consists in mixing the vitamin D ester with the solubilizing agent and heating moderately to obtain a homogeneous solution which may, if desired, be diluted with a small amount of water. This solution is then combined with a separately prepared solution of calcium salt or salts in a relatively larger amount of water. The combined solution may then be filtered and packaged in ampules in the usual manner. The filled ampules are heated to a sterilizing temperature in an autoclave or the like and cooled.

The following specific examples are illustrative of certain preferred embodiments of the invention.

*Example I*

With careful heating dissolve 66 mg. of vitamin D$_3$ butyrate in 500 mg. of (ethylene glycol)$_{40}$ monoricinoleate (i.e. a polyethylene glycol monoricinoleate containing 40 oxyethylene groups per molecule), and then dilute gradually with water to make 5 ml. Introduce the vitamin solution into 995 ml. of distilled oxygen-free water containing in solution 50 gm. of calcium gluconate and 62 gm. of calcium glucoheptonate, filter, fill into ampules, and autoclave under pressure. After cooling down, the ampules are entirely clear and contain, in 10 ml., 22,000 I.U. of vitamin D$_3$ and 100 mg. of calcium.

*Example II*

With careful heating dissolve 64 mg. of vitamin D$_2$ propionate in 500 mg. of sorbitan mono-oleate (ethylene oxide)$_{20}$, and then add water gradually to make 5 ml. Introduce the vitamin solution into 995 ml. of distilled oxygen-free water containing in solution 120 gm. of calcium glucoheptonate, filter, fill into ampules, and autoclave under pressure. After cooling down, the ampules are completely clear and contain, in 10 ml., 22,000 I.U. of vitamin D$_2$ and 100 mg. of calcium.

I claim:

1. A stable heat sterilizable aqueous solution of a therapeutically active vitamin D compound and a non-toxic calcium salt suitable for parenteral administration which comprises; a clear water solution of a non-toxic water soluble therapeutically active calcium salt and a non-toxic therapeutically active vitamin D ester of a fatty acid having from 1 to 5 inclusive carbon atoms, said solution containing a fatty acid ester of a polyoxyalkylene compound as a solubilizing agent for said vitamin D ester, and said polyoxyalkylene compound having between about 20 to 50 oxyalkylene groups per molecule.

2. A stable heat sterilizable aqueous solution of a therapeutically active vitamin D compound and a non-toxic calcium salt suitable for parenteral administration which comprises; a clear water solution of a non-toxic water soluble therapeutically active calcium salt and a therapeutically active vitamin D ester of a fatty acid having from 1 to 5 inclusive carbon atoms, said solution containing a polyoxyalkylene compound as a solubilizing agent for said vitamin D ester, and said polyoxyalkylene compound being selected from the group consisting of a mono-fatty acid ester of a polyalkylene oxide, a partial ester of a fatty acid and an anhydride of a polyvalent alcohol etherified with a polyalkylene oxide, and a partial ester of a fatty acid and a polyvalent alcohol etherified with a polyalkylene oxide, with each said polyoxyalkylene compound having between about 20 to 50 oxyalkylene groups per molecule, and said oxyalkylene groups being selected from the group consisting of ethylene oxide and propylene oxide.

3. A stable heat sterilizable aqueous solution as in claim 2, wherein said vitamin D ester is selected from the group consisting of vitamin D propionate and vitamin D butyrate.

4. A stable heat sterilizable aqueous solution as in claim 2, wherein said calcium salt comprises a major proportion by weight of said therapeutically active components of said solution and is selected from the group of calcium salts consisting of calcium gluconate, calcium glucoheptonate, calcium gluconate glucoheptane, calcium levulinate, calcium saccharate, and calcium methionate.

5. A stable heat sterilizable aqueous solution as in claim 2, wherein said polyoxyalkylene compound is a fatty acid ester of a polyoxyethylene compound having between 20 to 50 oxyethylene groups per molecule.

6. A stable heat sterilizable aqueous solution as in claim 5, wherein said polyoxyethylene compound is selected from the group consisting of mono-ricinoleate-(ethylene glycol)$_{40}$, sorbitan mono-oleate (ethylene oxide)$_{20}$, and propylene glycol mono-stearate-(ethylene oxide)$_{25}$.

References Cited in the file of this patent

UNITED STATES PATENTS

| | | |
|---|---|---|
| 2,417,299 | Freedman et al. | Mar. 11, 1947 |
| 2,907,696 | Stieg et al. | Oct. 6, 1959 |
| 3,032,468 | Ham et al. | May 1, 1962 |

FOREIGN PATENTS

| | | |
|---|---|---|
| 712,505 | Great Britain | July 28, 1954 |

OTHER REFERENCES

Mima: Pharmaceutical Society of Japan, vol. 77, pp. 1201–3 (1957), and vol. 78, pp. 381–6 (1958).